April 30, 1935.  G. W. ANDERSON  1,999,988

TREAD FOR PNEUMATIC TIRES

Filed Sept. 23, 1933  2 Sheets-Sheet 1

INVENTOR
George W. Anderson
BY Evans & McCoy
ATTORNEYS

April 30, 1935.  G. W. ANDERSON  1,999,988
TREAD FOR PNEUMATIC TIRES
Filed Sept. 23, 1933   2 Sheets-Sheet 2

INVENTOR
George W. Anderson
BY Evans & McCoy
ATTORNEYS

Patented Apr. 30, 1935

1,999,988

UNITED STATES PATENT OFFICE 1,999,988

TREAD FOR PNEUMATIC TIRES

George W. Anderson, Akron, Ohio, assignor to The General Tire & Rubber Company, Akron, Ohio, a corporation of Ohio Application September 23, 1933, Serial No. 690,678

3 Claims. (Cl. 152—14)

This invention relates to treads for pneumatic tire casings and has for its object to provide a tread which has a groove and rib design, which will be resistant to wear, which will provide effective traction and resistance to side slip, and which will enable the tire to operate noiselessly while running at high speeds over road surfaces.

Pneumatic tire casings of conventional design having tread ribs to provide traction and resistance to side slip, when driven at high speeds on a smooth road surface, create a high pitched, humming noise which is very objectionable particularly when the motor vehicle equipped with such tires has a quiet running engine and transmission.

The present invention provides a tire tread which has a configuration such that it is well adapted to withstand wear, which is effective to resist circumferential or lateral slip and which has ground engaging lugs or ribs so shaped and interspersed throughout the tread that the tire is substantially noiseless in operation.

With the above and other objects in view, the invention may be said to comprise a tire tread as illustrated in the accompanying drawings hereinafter described and particularly set forth in the appended claims together with such variations and modifications thereof as will be apparent to one skilled in the art to which the invention appertains.

Reference should be had to the accompanying drawings forming a part of this specification in which.

Figure 1:
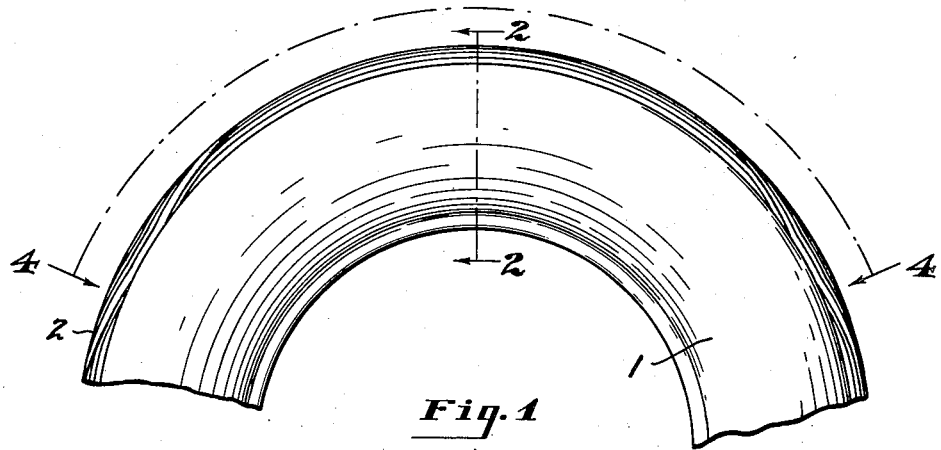
Fig. 1 is a fragmentary side elevation of a tire casing having a tread embodying the present invention.
Figure 3:
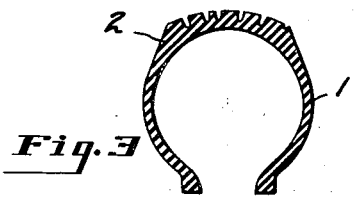
Fig. 3 is a section taken on the line indicated at 3—3 in Fig. 4.
Figure 2:
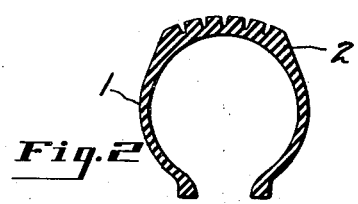
Fig. 2 is a section taken on the line indicated at 2—2 in Fig. 4.

Figs. 5 to 9, inclusive, are fragmentary plan views showing variations in the tread configuration;

As shown in Figs. 1, 2 and 3 of the drawings, the tire tread of the present invention is applied to a pneumatic tire casing 1 which has a thickened elastic tread portion 2. The tire tread of the present invention has circumferentially elongated relatively narrow ribs separated by circumferentially extending grooves. The circumferentially extending ribs all taper to a sharp point at the intersection of circumferentially extending grooves which are disposed at small angles one to another at their points of intersection, so that each of the elongated ribs is gradually brought into and out of engagement with the ground surface during the travel of the tire, there being no edges disposed at or near right angles to the direction of travel and no air pockets which may be abruptly brought into or out of engagement with the ground surface, so that vibrations are not set up by abrupt engagement or disengagement of traction lugs or ribs or by abrupt creation of air currents into or out of air pockets. Furthermore, the relatively sharp ends of the circumferentially elongated ribs are offset circumferentially so that laterally adjacent ribs are successively engaged and disengaged from the road surface.

Figure 4:
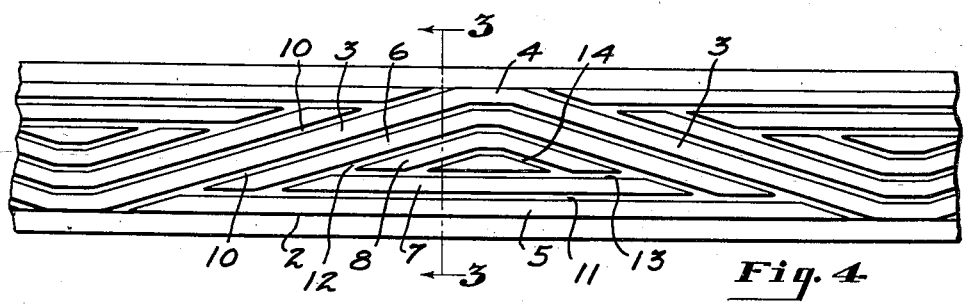
Fig. 4 is a plan view of a portion of the tread.

Referring particularly to Fig. 4 of the drawings, the tread has a circumferentially continuous zig zag rib 3 which has short portions 4 disposed alternately along opposite edges of the tread and connected by diagonal portions, portions 4 being at opposite sides of the tread and successive angular portions of the ribs being oppositely inclined. Intermediate the portions 4 of the ribs 3 along each side of the tread there are straight circumferential ribs 5 which are disposed parallel with the center plane of the tread. Each rib 5, together with oppositely inclined portions of the rib 3 bound a circumferentially elongated, triangular space in which there is a V-shaped rib 6 having oppositely inclined leg portions parallel with the oppositely inclined portions of the rib 3 and terminating adjacent the inner side of the rib 5. A rib 7 parallel with the rib 5 is disposed between the oppositely inclined leg portions of the V-shaped rib 6 and within the triangular space bounded by the ribs 6 and 7 second V-shaped rib 8 is disposed parallel to the rib 6 and between the ribs 7 and 8 there is a circumferentially elongated triangular rib 9. The continuous rib 3 is separated from the adjacent V-shaped ribs 6 and from the end of the ribs 5 by narrow grooves 10. The rib 5 is separated from the inner rib 7 and from the ends of the rib 6 by a groove 11. The rib 6 is separated from the inner V-shaped rib 8 and from the ends of the rib 7 by a groove 12. The rib 7 is separated from the triangular rib 9 and from the ends of the rib 8 by a groove 13 and the rib 8 is separated from the triangular rib 9 by a groove 14.

It will be apparent that all of the grooves extend circumferentially and intersect at the circumferential extremities of the ribs, providing each of the ribs with sharp leading edges. Furthermore, it will be observed that the circumferential extremities of the ribs are offset circumferentially so that the non-continuous ribs are successively brought into and out of engagement with the ground surface. Furthermore, the grooves are of substantially uniform width so that there are no air pockets which can be abruptly brought into or out of engagement with the ground surface.

Figure 5:
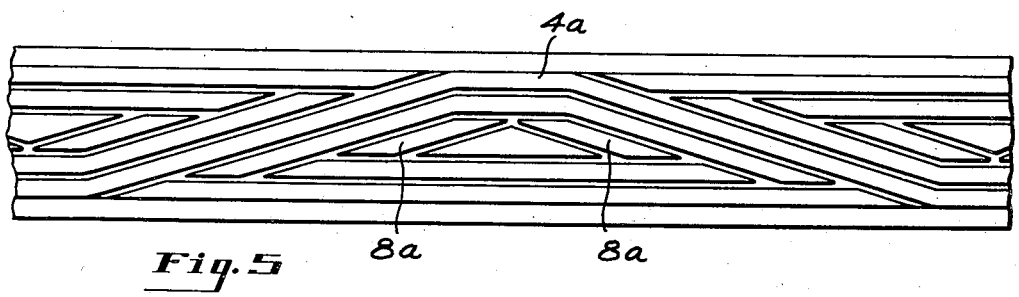

Fig. 5 of the drawings shows a construction similar to that shown in Fig. 4 except that the portions 4a of the continuous rib are somewhat longer than the corresponding portions 4 of the tread shown in Fig. 4 and the inner V-shaped rib 8 is replaced by two short diagonally disposed ribs 8a. As in Fig. 4 all of the ribs or lugs are circumferentially elongated with sharp leading edges formed by the intersection of the circumferentially straight and diagonal grooves.

Figure 6:
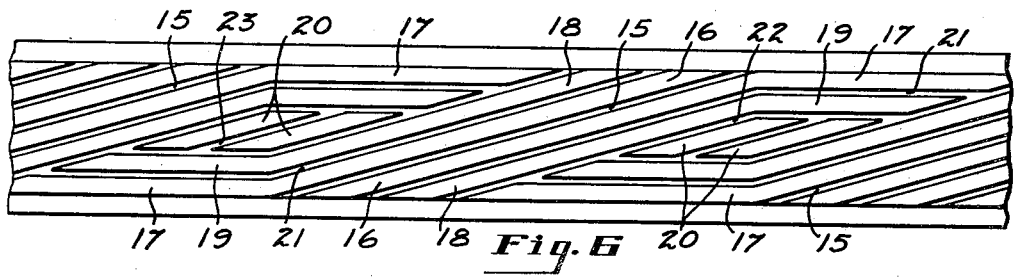

In Fig. 6 of the drawings a somewhat different design is provided in which all of the ribs or lugs are circumferentially elongated and have pointed leading edges formed by the inter-sectionally straight and diagonal grooves. In this design the tread is divided into a series of identical parallelogram designs by diagonal grooves 15 extending across the tread. Each parallelogram has two marginal ribs, one on each side of its long diagonal, each of the two ribs having a straight circumferential portion 17 along the side edge of the tread and a diagonal portion 16 alongside a groove 15 and extending across the tread. Within the two outer ribs there are two similarly shaped inner ribs which have diagonal portions 18 parallel with the portions 16 and straight circumferential portions 19 parallel with the portions 17 at the outer ribs. Within the parallelogrammatic space at the center of the parallelogram there are two diagonally disposed ribs 20. The two outermost ribs of the parallelogram are separated by grooves 21 and the inner L-shaped ribs are separated from the ribs 20 and from the ends of the portions 17 and 19 of the L-shaped ribs by grooves 22, the two parallel diagonally disposed ribs 20 being separated by a groove 23.

Figure 7:
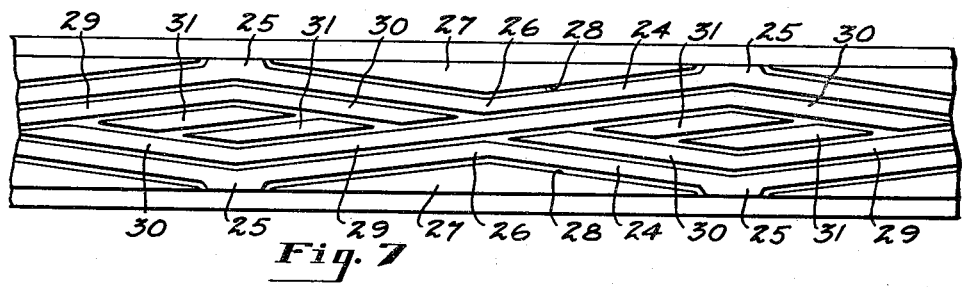

In Fig. 7 of the drawings two zig zag, continuous, circumferential ribs 24 are provided. These ribs have apices 25 which are disposed at the edges of the tread and transversely aligned. These two ribs 24 converge from the apices 25 to apices 26 which are laterally aligned centrally between the apices 25. Circumferentially elongated, triangular ribs 27 are provided along the margin of the tread between successive apices 25 of the ribs 24 and these triangular ribs are separated from the ribs 24 by a groove 28. Between the ribs 24 are provided elongated ribs 29 each of which has a diagonally extending portion across the space between the transversely aligned inner apices 26 of the ribs 24. The diagonally disposed central portion of each rib 29 extends from adjacent apex 25 parallel with the adjacent diagonally disposed portion of the rib 24 across the space between the next pair of apices 26 and parallel with the diagonally disposed portion of the opposite rib and to adjacent its apex 25. Each rib 29 has its end portions 30 inclined oppositely with respect to the central portion of the rib, disposed parallel with the adjacent diagonal portion of a rib 24 and terminating adjacent the central portion of the tread adjacent the diagonal portion of the next intermediate rib 29. A parallelogrammatic space is provided between the overlapping end portions of the ribs 29 and in this space short diagonally disposed ribs or lugs 31 are provided.

As in previous modifications, all of the ribs and lugs are circumferentially elongated and pointed at their circumferentially remote ends, the spaces between the lugs or ribs being in the form of narrow grooves which intersect at sharp angles to provide sharp pointed traction ribs or lugs.

Figure 8:
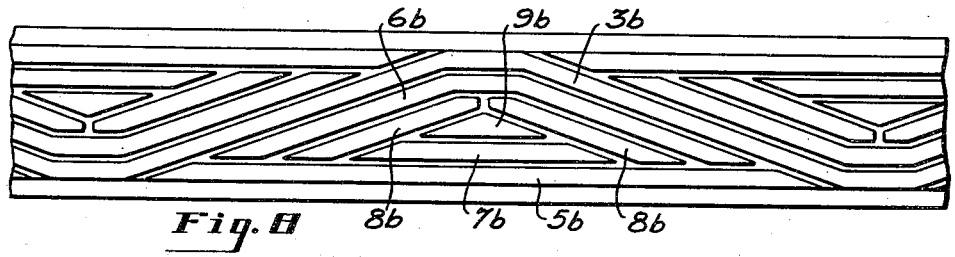

In Fig. 8 of the drawings there is shown a design similar to that shown in Fig. 4 but which differs from the design shown in Fig. 4 in that the triangular space between the ribs 3b and 5b have a slightly different arrangement of ribs or lugs, there being a central triangular lug 9b and a short rib 7b parallel with the side rib 5b and diagonal ribs 8b disposed parallel with the ends of the rib 7b and with sides of the triangular rib 9b.

Figure 9:
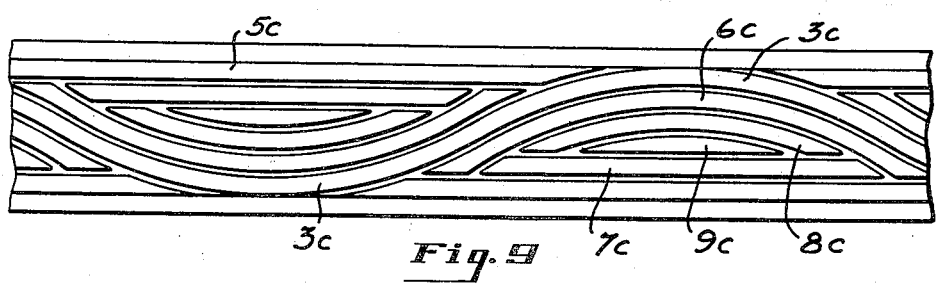

Fig. 9 of the drawings shows a design similar to that shown in Fig. 4 except that the continuous rib 3c is curved and the ribs 6c and 8c are of arcuate form. The inner rib 9c has one face parallel with the rib 8c and its opposite face parallel with the straight ribs 7c.

In all of the modifications disclosed, abrupt engagement of traction lugs or ribs with the ground surface is eliminated, the leading edges of the ribs or lugs are circumferentially offset and the grooves are so disposed that there are no air pockets. It will be observed that, in each modification of the invention herein shown, some of the grooves extend to the side edges of the tread and that the other grooves are in communication with the grooves opening to the side edges so that air will not be trapped in a flattened portion of the tread engaging the road surface.

The tread design of the present invention provides elongated ground engaging ribs and grooves which are staggered so as to avoid the generation of regularly repeated vibrational impulses and making the tire noiseless in operation. It has been found that a tire which has a tread provided with parallel continuous circumferentially straight ribs of uniform width is silent in operation, but such a tire is not satisfactory because it has poor traction and is subject to excessive wear, due to slippage. The present invention provides a tire which is not only silent in operation but which has good traction, which effectively resists side slip, and which has excellent wearing qualities.

The tire of the present invention has superior wear-resisting qualities for the reason that the elongated circumferential ribs crossing the tread at a small angle, less than 45° to the center line, are so disposed throughout the tread that the tread has substantially uniform rigidity throughout its circumference and there is no unequal flexing due to the tread configuration and no wiping or scrubbing action due to unequal deflection, the weight being at all times evenly distributed upon elongated ribs uniformly spaced across the ground engaging portion of the tread.

Effective traction and resistance to side slip is provided by the diagonally disposed tread crossing ribs and the diagonally disposed portions of intermediate ribs.

The silent operation of the tire of the present invention is believed to be due to the fact that the uniformly dispersed, circumferentially extending ribs are staggered to eliminate periodic impacts and are separated by grooves so disposed as to permit free escape of air from beneath the ground engaging portion, and to the fact that the ribs are so disposed that the tire is at all times supported upon a series of parallel, longitudinally extending ribs, uniformly spaced across the tread.

Although several embodiments of the invention have been herein shown and described it will be understood that numerous details of the construction shown may be altered or omitted without departing from the spirit of this invention as defined in the following claims.

What I claim is:

1. A pneumatic tire which has a peripheral tread provided, in portions thereof which are closely spaced throughout its circumference, with narrow ribs extending diagonally at an angle of less than forty-five degrees to the center line of the tread across the major portion of the width of the tread, circumferentially elongated intermediate ribs in the spaces between the tread crossing ribs, certain of which are parallel with the tread crossing ribs and all of which have edges disposed diagonally and substantially parallel to the tread crossing ribs, said intermediate ribs being staggered circumferentially with ribs upon opposite sides of tread crossing ribs in circumferentially overlapping relation, said ribs being separated by narow grooves of substantially uniform width which are dispersed uniformly throughout the tread so that any axial section through the tread intersects a plurality of circumferentially extending ribs.

2. A pneumatic tire which has a peripheral tread provided, in portions thereof which are closely spaced throughout its circumference, with narrow ribs extending diagonally at an angle of less than forty-five degrees to the center line of the tread across the major portion of the width of the tread, the tread crossing ribs in successive portions of the tread being of opposite angularity with respect to the center line of the tread, circumferentially elongated intermediate ribs in the spaces between the tread crossing ribs, certain of which are parallel with the tread crossing ribs and all of which have edges disposed diagonally and substantially parallel to the tread crossing ribs, said intermediate ribs being staggered circumferentially with ribs upon opposite sides of tread crossing ribs in circumferentially overlapping relation, said ribs being separated by narrow grooves of substantially uniform width which are dispersed uniformly throughout the tread so that any axial section through the tread intersects a plurality of circumferentially extending ribs.

3. A pneumatic tire which has a peripheral tread provided, in portions thereof which are closely spaced throughout its circumference, with narrow ribs extending diagonally at an angle of less than forty-five degrees to the center line of the tread across the major portion of the width of the tread, the tread crossing ribs in successive portions of the tread being of opposite angularity with respect to the center line of the tread, circumferentially elongated intermediate ribs in the spaces between the tread crossing ribs, certain of which are parallel with the tread crossing ribs and all of which have edges disposed diagonally and substantially parallel to the tread crossing ribs, said intermediate ribs being staggered circumferentially with ribs upon opposite sides of tread crossing ribs in circumferentially overlapping relation, said ribs being separated by narrow grooves of substantially uniform width which are dispersed uniformly throughout the tread so that any axial section through the tread intersects a plurality of circumferentially extending ribs, certain of the grooves extending to a side edge of the tread and all other grooves being in communication with a groove extending to an edge of the tread.

GEORGE W. ANDERSON.